(12) United States Patent
Chen et al.

(10) Patent No.: US 11,544,035 B2
(45) Date of Patent: Jan. 3, 2023

(54) AUDIO OUTPUTS BASED ON POSITIONS OF DISPLAYS

(71) Applicant: Hewlett-Packard Development Company, L.P., Spring, TX (US)

(72) Inventors: Chieh-Hao Chen, Taipei (TW); Yi-Hsuan Huang, Taipei (TW); Tao-Sheng Chu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/048,148

(22) PCT Filed: Jul. 31, 2018

(86) PCT No.: PCT/US2018/044514
§ 371 (c)(1),
(2) Date: Oct. 16, 2020

(87) PCT Pub. No.: WO2020/027793
PCT Pub. Date: Feb. 6, 2020

(65) Prior Publication Data
US 2021/0149620 A1 May 20, 2021

(51) Int. Cl.
*G06F 1/16* (2006.01)
*H04R 1/32* (2006.01)
*G06F 3/16* (2006.01)

(52) U.S. Cl.
CPC ............ *G06F 3/165* (2013.01); *H04R 1/323* (2013.01); *H04R 2499/15* (2013.01)

(58) Field of Classification Search
CPC . H04R 1/20; H04R 1/32; H04R 1/323; H04R 29/00; H04R 29/001; H04R 2499/10; H04R 2499/15; G06F 3/16; G06F 3/165
See application file for complete search history.

(56) References Cited

U.S. PATENT DOCUMENTS

| | | | |
|---|---|---|---|
| 5,838,537 A | 11/1998 | Lundgren et al. | |
| 6,201,554 B1 * | 3/2001 | Lands | G06F 3/0485 345/169 |
| 8,095,073 B2 | 1/2012 | Hayes et al. | |
| 8,681,113 B1 | 3/2014 | Wu et al. | |
| 9,065,410 B2 | 6/2015 | Holman et al. | |
| 9,084,070 B2 | 7/2015 | Crockett et al. | |
| 9,407,230 B2 | 8/2016 | Kikuchi et al. | |
| 9,912,797 B2 | 3/2018 | Yliaho et al. | |
| 2004/0040434 A1 * | 3/2004 | Kondo | G10H 1/0008 84/604 |
| 2007/0160222 A1 | 7/2007 | Trepte | |
| 2008/0146289 A1 | 6/2008 | Korneluk et al. | |
| 2011/0158436 A1 | 6/2011 | Imamura | |
| 2012/0128184 A1 | 5/2012 | Kim et al. | |
| 2013/0279706 A1 * | 10/2013 | Marti | G06F 1/1688 381/57 |
| 2014/0061425 A1 | 3/2014 | Eoh | |

FOREIGN PATENT DOCUMENTS

JP 04333136 A * 11/1992 ............... G06F 3/16

* cited by examiner

*Primary Examiner* — Thang V Tran
(74) *Attorney, Agent, or Firm* — Quarles & Brady LLP

(57) ABSTRACT

A computing device may include a display, an audio output device, a sensor to detect the position of the display relative to the audio output device, and a processor to receive the detected position of the display and adjust audio output from the audio output device based on the detected position of the display.

13 Claims, 9 Drawing Sheets

AUDIO OUTPUTS BASED ON POSITIONS OF DISPLAYS

BACKGROUND

Computing devices with display devices and display devices generally may include audio output devices. These audio output devices allow a user to listen to audio presented along with a video output associated with the video. The audio is presented to the user via a number of audio output devices such as speakers.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
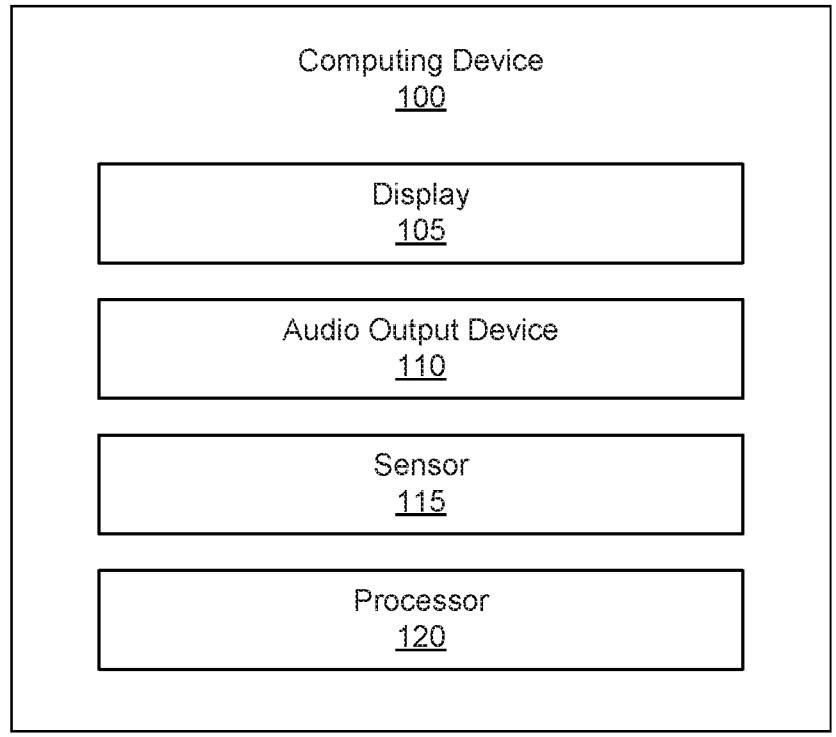
FIG. 1 is a diagram of a block diagram of a computing device according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Computing devices may include a number of input and output devices used to allow a user to interact with the computing device. Similarly, display devices that may or may not be associated with a computing device may include output devices that allow a user to receive information. In both these cases, an audio output device may be used to convey audio to a user. The audio presented to the user via the audio output device (often called a speaker) may or may not coordinate with visual output of a display device of the computing device or a display device such as a television.

The display device may, therefore, include an audio output device positioned on and coupled to the display device so as to provide the audio to a user. In some examples, the position of the display devices may be adjusted so that the user may view the images displayed on the display device in a number of positions. As the position of the display device is changed, the position of the audio output device is also changed. Although changing the position of the display device may allow the user to consistently view the display correctly, such adjustments may alter the audio output from the audio output devices as perceived by the user. This may be due to the reflection of the audio from surfaces or away from a user. In some examples, the adjustment of the display device may, itself, prevent the audio from being directed to a user. In yet other examples, the position of the display may alter the quality of the audio perceived by the user.

The present specification describes a computing device may include a display, an audio output device, a sensor to detect the position of the display relative to the audio output device, and a processor to receive the detected position of the display and adjust audio output from the audio output device based on the detected position of the display.

The present specification further describes an all-in-one computing device that includes a display, an audio output device coupled to the display by an adjustable arm, the audio output device opposite a display side of the display, a processor communicatively coupled to the display and audio output device, and a position sensor to detect the position of the display relative to the audio output device wherein the processor receives a detected position of the display relative to the audio output device and adjusts audio output from the audio output device.

The present specification also describes an audio compensator that includes a processor to receive data describing a position of a display wherein the processor adjusts audio output by an audio output device based on the position of the display.

Turning now to the figures, FIG. 1 is a diagram of a block diagram of a computing device (100) according to an example of the principles described herein. In this example, the computing device (100) may include a display (105), an audio output device (110), a sensor (115), and a processor (120). In some examples, the computing device (100) may be an all-in-one computing device that integrates the components of a computing device such as the memory and processor into the display (105). In this example, the all-in-one computing device also includes the audio output device (110) as described herein.

The computing device (100) may be any type of computing device that includes a processor (120) that executes computer readable program code as described herein. The computing device (100) may maintain this computer readable program code on a data storage device. Thus, the computing device (100) may be an all-in-one computing device, a desktop computer, a laptop computer, personal digital assistant (PDA), a mobile device, a smartphone, a gaming system, or a tablet, among other types of computing devices (100).

The display (105) may be any type of display that presents a user with an image. The image may be presented to a user via execution of the computer readable program code by the processor (120). The image may include any text, images, or other graphics. In an example, the image may include video that includes a related audio to be output by the audio output device (110). In any example presented herein, the position of the display (105) may be adjusted to allow the user to view the image from a variety of directions. In an example, the position of the display (105) may be vertical such that the plane of a front side of the display (105) is perpendicular or near perpendicular to, for example, a surface of a desk where the display (105) is placed. In some examples, the display (105) may be tilted so as to allow a user to look down onto the surface of the display (105) with the angle of the display (105) relative to a surface it rests on being varied in any degree. These angles of the display (105) relative to the surface may range from 90° (perpendicular) to 0° (parallel).

The audio output device (110) may be any type of audio output device (110) that may, upon execution of the computer readable program code, emits sounds waves. In an example, the audio output device (110) may be coupled to the display (105) in a fixed manner. In this example, the position of the fixed audio output device (110) may be adjusted as the position of the display (105) is also adjusted. As this occurs, the quality of the audio output by the audio output device (110) may change as the position of the display (105) is adjusted. By way of example, where the audio output device (110) is placed at a bottom edge of the display (105), the direction of the sound waves emitted by the audio output device (110) will change as the position of the display (105) changes. Although specific examples are presented herein describing specific positioning of the audio output device (110) relative to the display (105), the present specification contemplates the placement of the audio output device (110) at any location relative to the display (105). Indeed, the positioning of the audio output device (110) on the display (105), according to the present examples described herein, allow for the adjustment of the audio output by the audio output device (110) based on that positioning of the display (105) and the audio output device (110).

In any example presented herein, the computing device (100) may include a sensor (115). The sensor (115) may be any device or combination of devices that detects the position of the display (105). In an example, the sensor (115) may detect the position of the display (105) relative to the audio output device (110). In an example, the sensor (115) may detect the position of the display (105) relative to any surface. In an example, the sensor (115) may detect the absolute position of the display (105). Examples of sensors (115) that may be used include a gravitational sensor (accelerometer), a gyro-sensor, a hall sensor, a light-emitting diode (LED) switch, a tact switch, among other sensors. In a specific example presented herein, the display (105) may include an arm coupling the display (105) to a base in order to hold the display (105) in any position described herein. The sensor (115) in this example and in any examples presented herein may be any mechanical device that can detect the positioning of the arm relative to the display (105) and/or base as described. The sensor (115) may also be any type of optical sensor or combination of optical sensors that can detect the position of the display (105), arm, and/or base. In any example presented herein, however, the sensor (115) may detect the position of the display (105) and, accordingly, the position of the audio output device (110) and relay positional data to the processor (120).

The processor (120) may include the hardware architecture to retrieve executable code from a data storage device and execute the executable code. The executable code may, when executed by the processor (120), cause the processor (120) to implement the functionality of receiving a detected position of the display (105) and adjust audio output from the audio output device (110) based on the detected position of the display (105), according to the methods of the present specification described herein. In any example presented herein, the adjustment of the audio output by the audio output device (110) may take into consideration the position of the user relative to the viewing surface of the display (105) as the position of the display (105) and, accordingly, the position of the audio output device (110) are changed.

The adjustment of the audio output by the audio output device (110) may include any human perceptible and human non-perceptible changes to the audio characteristics of the sound produced by the audio output device (110). Example changes to the audio output by the audio output device (110) may include the volume of the sound produced, the frequencies of sound emitted by the audio output device (110), the number of frequencies of sound produced by the audio output device (110), the range of frequencies of sound produced by the audio output device (110), the volume of any given frequency of sound produced by the audio output device (110), and the pitch of the sound produced by the audio output device (110), among other audio characteristics of the audio output by the audio output device (110).

In any example presented herein, the processor (120) may automatically adjust the audio characteristics of the audio output by the audio output device (110) as signals related to the detected position of the display (105) are sent to the processor (120) from the sensor (115). In an example, the display (105) may be mechanically adjustable according to a set number of positions such as a 90°, 45°, or 30° angle relative to a surface of a desk. As such, the processor (120) may execute computer readable program code that, when executed, adjusts the audio output by the audio output device (110) according to preset audio output adjustment settings. These preset audio output adjustment settings may each correlate with one of the positions (90°, 45°, or 30°) that the display (105) may be placed in. Upon detection that any one of these positions of the display (105) are achieved, the processor (120) may execute the computer readable program code to adjust the audio output by the audio output device (110) according to the preset audio output adjustment setting associated with the detected position. In this example, any one of the characteristics of the audio output by the audio output device (110) may be adjusted so as to maintain a human perceptible quality of audio presented to a user.

In any example presented herein, the preset audio output adjustment settings may be customized and/or created by a user. In this example, the user may manipulate the audio output by accessing a user interface presented on the display (105) via execution of computer usable program code by the processor (120). The user may further assign a customized audio output adjustment setting to a specific detected position of the display (105). As a consequence, whenever the specific detected position of the display (105) is detected by the sensor (115), the processor (120) may execute the user-assigned and user-customized audio output. In any example presented herein, the user interface presented on the display (105) may provide a preconfigured setting as a starting point for the user to manipulate. In this example, the user may make relatively slight adjustments to the characteristics of the audio output compared to being provided with no suggested settings at all. Because some users' ability to hear different sounds at different frequencies changes both over time and from user to user, those preset audio output adjustment settings set by a specific user may be associated with that specific user and saved as such in order to be implemented when that specific user logs into or otherwise indicates the user is using the computing device (100).

In some examples, the position of the display (105) may be within a specific range among a possible range of positions. In this example, instead of the mechanical features of the display (105) allowing the display to be placed at specific angles relative to a surface of a desk, the position of the display (105) may be placed at any angle from 90° to 0° relative to the desk. The relatively finer adjusted angles may be detected by the sensor (115) and the position may be relayed to the processor (120) for the processor (120) to determine which and to what extent the characteristics of the audio output by the audio output device (110) are to be changed. In this manner, the user may continuously be presented with a consistent quality of audio regardless of the position of the display (105) and audio output device (110). This provides an audibly comfortable environment for a user to engage with the display (105).

Figure 2:
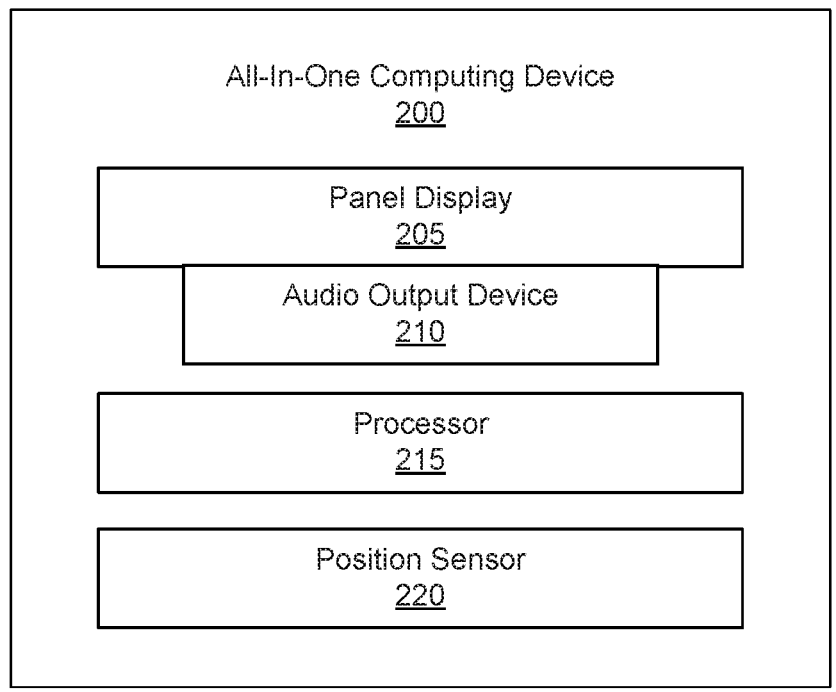
FIG. 2 is a block diagram of an all-in-one computing device according to an example of the principles described herein.

FIG. 2 is a block diagram of an all-in-one computing device (200) according to an example of the principles described herein. In this example, the all-in-one computing device (200) may include, within a single housing, the panel display (205), the audio output device (210) fixedly coupled to the panel display (205), the processor (215), a data storage device, as well as other hardware devices including printed circuit boards (PCBs), ports, and busses, among others.

In this example, the relative position of the audio output device (210) to the panel display (205) is understood by the processor (215) to be at a fixed location relative to the panel display (205). This information is used to optimize the audio output by the audio output device (210). Again, the position sensor (220) may provide the processor (215) with the relative or absolute position of the panel display (205). The processor (215) may adjust the characteristics of the audio output by the audio output device (210) so as to optimize the audio for a user viewing the images presented on the panel display (205). In some examples, the adjustment of the audio is based on an assumed position of the user: immediately in front of the viable surface of the panel display (205). In this example, the processor (215) may adjust the audio output by the audio output device (210) based on the position (either directly sensed or physically determined by the processor) of the viewable surface of the panel display (205).

In any example presented herein, the all-in-one computing device (200) may include a data storage device. The data storage device may store data such as executable program code that is executed by the processor (215) or other processing device. The data storage device may specifically store computer code representing a number of applications that the processor (215) executes to implement at least the functionality described herein.

The data storage device may include various types of memory modules, including volatile and nonvolatile memory. For example, the data storage device of the present examples may include Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage purposes. For example, in certain examples the processor (215) may boot from Read Only Memory (ROM), maintain nonvolatile storage in the Hard Disk Drive (HDD) memory, and execute program code stored in Random Access Memory (RAM).

Figure 3:
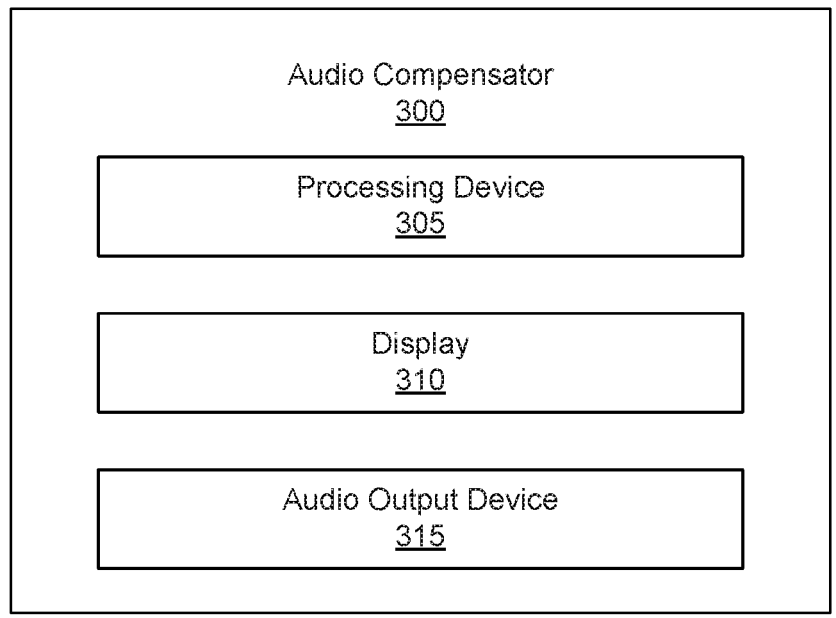
FIG. 3 is a block diagram of an audio compensator according to an example of the principles described herein.

FIG. 3 is a block diagram of an audio compensator (300) according to an example of the principles described herein. The audio compensator (300) may include a processing device (305) that receives data describing a position of a display (310). As described herein, the position of the display (310) may be detected using any type of sensor as described herein. During operation, the processing device (305) may adjust audio output by an audio output device (315) based on the position of the display (310).

The audio compensator (300), in an example, may be an application specific integrated circuit (ASIC) that executes computer usable program code to adjust audio output by the audio output device (315). The audio compensator (300) may further receive input describing a customization of a predetermined audio setting. Whenever a specified position of the display (310) is detected, the customized or a preset audio setting is executed to produce audio output as described herein.

In any example described herein, the audio compensator (300) may interface with an equalizer, a compressor, a limiter, a dynamic range controller, any other type of audio device or executable program code, or combinations thereof in order to adjust the characteristics of audio output by the audio output device (315).

Figure 4A:
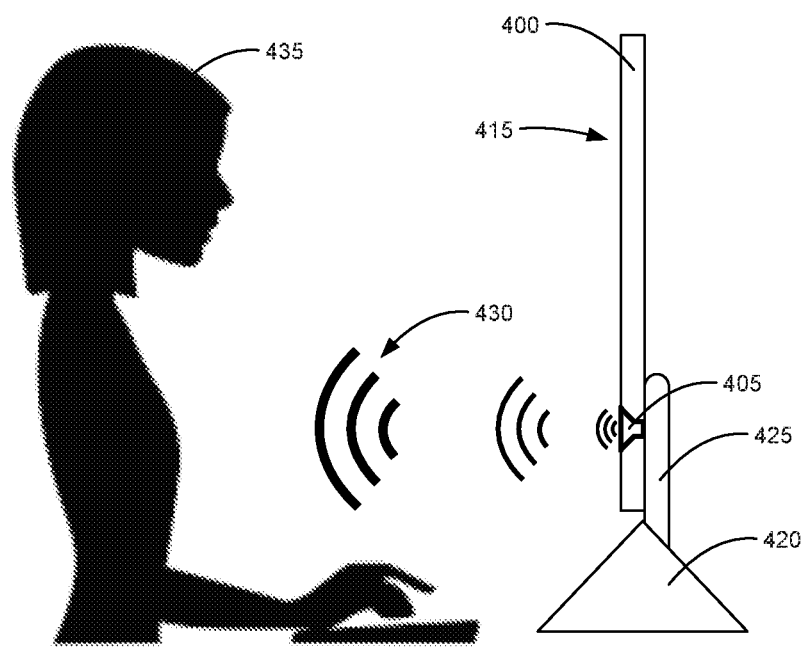
FIGS. 4A-4C are block diagrams depicting positional changes in a display and audio output device according to an example of the principles described herein.
Figure 4B:
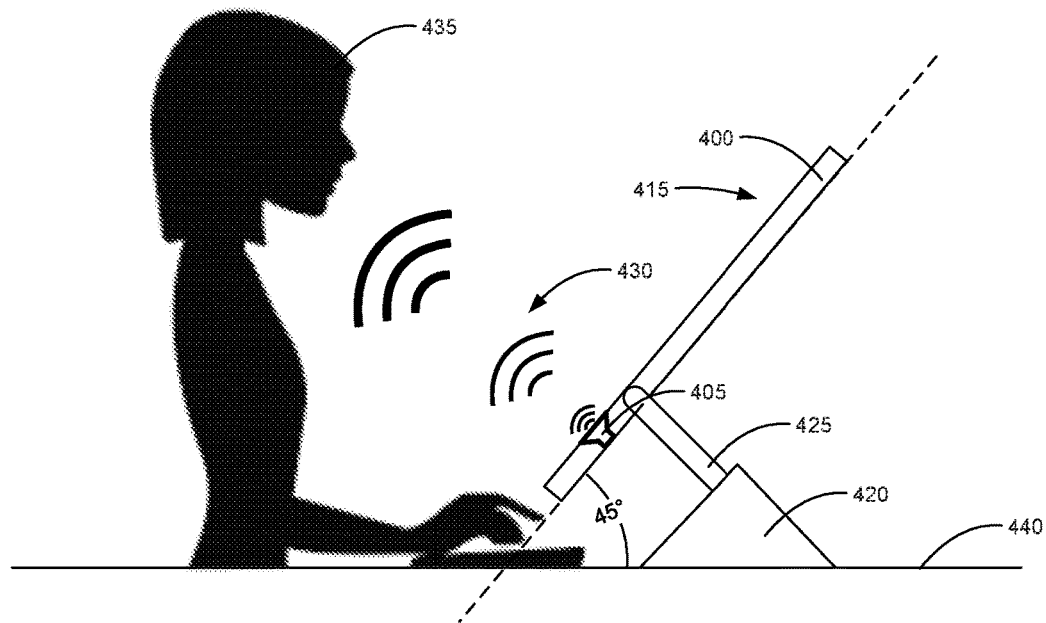
Figure 4C:
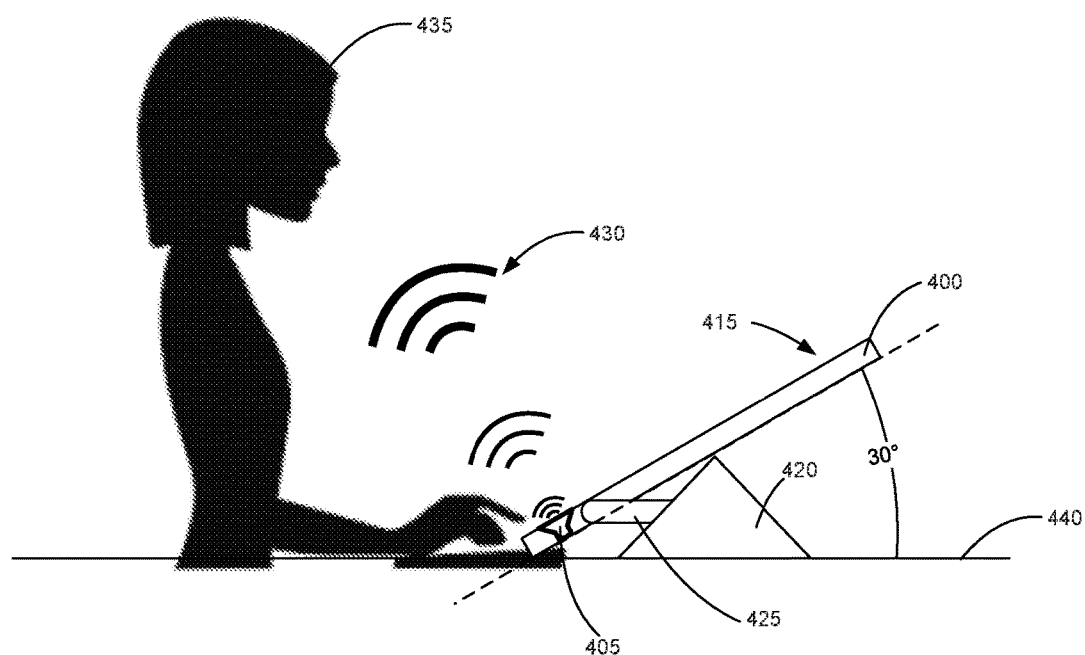

FIGS. 4A-4C are block diagrams depicting positional changes in a display (400) and audio output device (405) according to an example of the principles described herein. In these examples, the audio output device (405) may be affixed to the display (400) with the sound (410) being projected perpendicular to a viewing surface (415) of the display (400). Although the present specification contemplates various positions of the audio output device (405) with the display (400), the principles described herein apply equally to those hardware arrangements where the audio output device (405) is not projecting sound waves perpendicular to the viewing surface (415) of the display (400). Thus, the present specification contemplates the various other positionings of the audio output device (405) on the display (400).

The display (400) may be coupled to a stand (420) via an articulating arm (425). The articulating arm (425) may allow the display (400) to be moved as described herein. In an example, the stand (420), the display (400), and or the articulating arm (425) may include a sensor (FIG. 1, 115) used to detect the position of the display (400). Positional data describing the position of the display (400) from the sensor (FIG. 1, 115) may be sent to a processor (FIG. 1, 120). The processor (FIG. 1, 120), during operation, may use the positional data from the sensor (FIG. 1, 115) to determine how to adjust audio output of the audio output device (405).

In FIG. 4A specifically, the audio output (430) (soundwaves) from the audio output device (405) is being directed towards the user (435) at a perpendicular or near perpendicular direction relative to the user (435) and/or the viewing surface (415) of the display (400). In this configuration, the processor (FIG. 1, 120) may have a preset audio output adjustment setting assigned. The preset audio output adjustment setting may have been a user (435) created preset audio output adjustment setting or may have been a user (435) augmented/adjusted preset audio output adjustment setting. In either example, the preset audio output adjustment setting may be assigned to the specific detected position of the display (400) and/or the specific user (435) interacting with the display (400).

FIG. 4B shows a second example position of the display (400). In this example, the articulating arm (425) may be adjusted to place the display (400) at a 45° or near 45° angle relative to a surface (440) the stand (420) is resting on. This position of the display (400) may also have a preset audio output adjustment setting associated with it such that when the display (400) is placed in this position, the processor (FIG. 1, 120) executes computer readable program code representative of the preset audio output adjustment setting associated with the position. The audio output (430) in FIG. 4B shows the audio being directed more towards the user's (435) facial area. In this example, the volume, frequency, or any other characteristics of the audio output (430) may be adjusted according to the preset audio output adjustment setting in order to provide an optimal sound quality as the audio output (430) reaches the user's (435) ears. As described herein, what is deemed to be an optimal audio output (430) may vary by audio output device (405) and user (435) among other factors. In any example, the preset audio output adjustment settings for any position may be changed by the user (435) as described herein in order to achieve a user-optimal sound quality.

FIG. 4C shows a third position of the display (400) that is 30° or near 30° relative to surface (440) the stand (420) is resting on. This position of the display (400) may also have a preset audio output adjustment setting associated with it such that when the display (400) is placed in this position, the processor (FIG. 1, 120) executes computer readable program code representative of the preset audio output adjustment setting associated with the position. Again, due to the direction of the audio output (430) being changed, the audio output (430) may be changed by the processor (FIG. 1, 120) using the preset audio output adjustment setting.

Figure 5A:
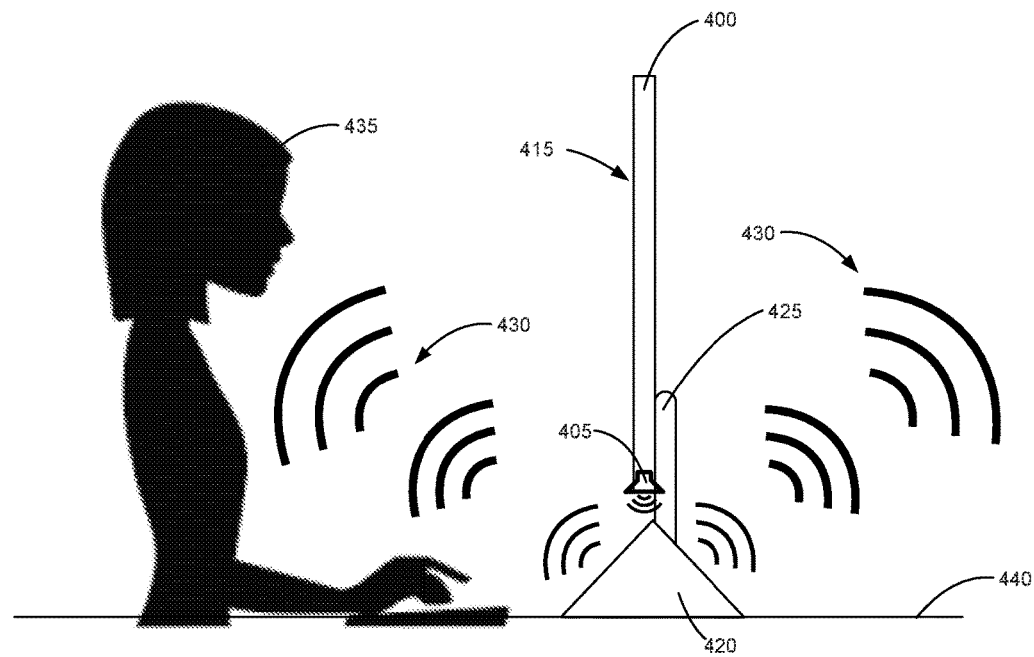
FIGS. 5A-5C are block diagrams depicting positional changes in a display and audio output device according to an example of the principles described herein.
Figure 5B:
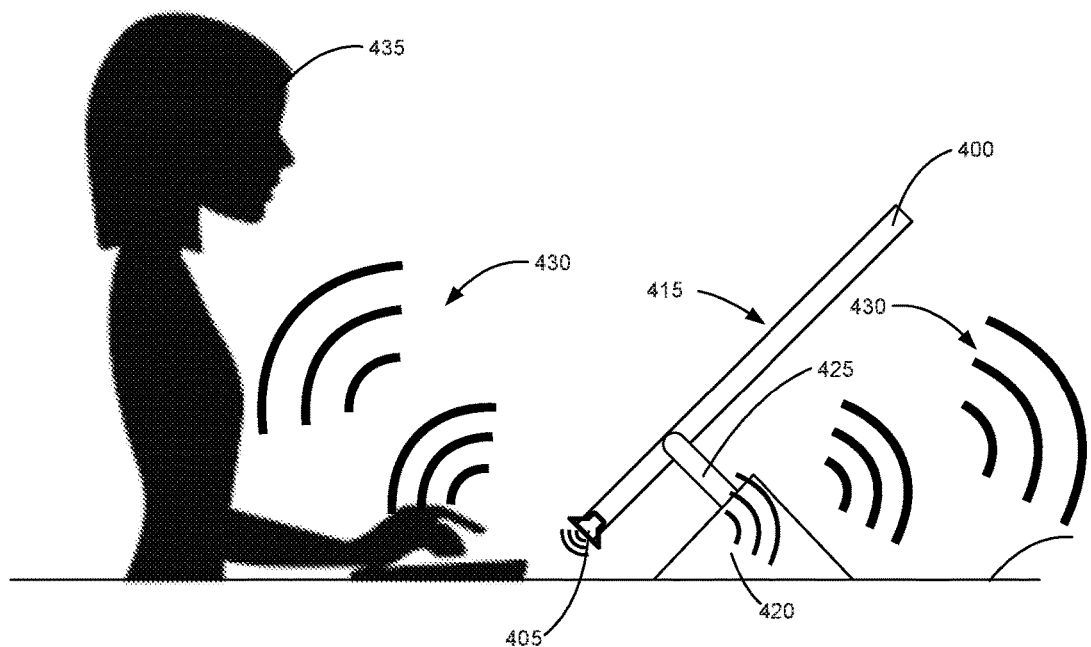
Figure 5C:
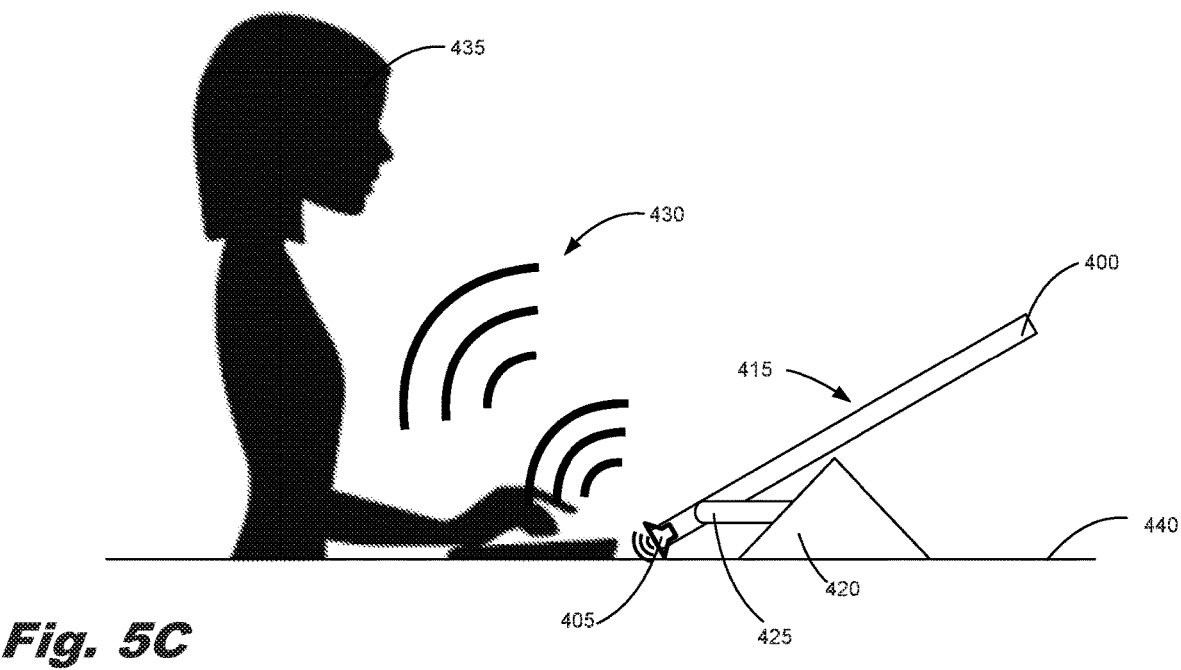

FIGS. 5A-5C are block diagrams depicting positional changes in a display (400) and audio output device (405) according to an example of the principles described herein. In contrast to the display (400) device shown and described in connection with FIGS. 4A-4C, the audio output device (405) coupled to the display (400) in FIGS. 5A-5C is directed towards the surface (440) the stand (420) of the display (400) is resting on. In this example, the audio output (430) may be reflected from a variety of surfaces including the stand (420), articulating arm (425), and/or surface (440). Despite this, however, the audio output (430) may be adjusted to, in any position, optimize the audio output (430) per the processes and methods descried herein.

In the various positions of the display (400) shown in FIGS. 4A-5C may cause reflection of the audio output (430) any nay number of ways. Indeed, although FIGS. 4A-5C show three general positions of the display (400) (90, 45, and 30° angles relative to the surface (440)), any number of intermediate positions may be realized and assigned a preset audio output adjustment setting. Indeed, in an example, characteristics of the audio output (430) from the audio output device (405) may be adjusted using a sliding scale effect. For example, where the volume at any given frequency is to be changed, as the user adjusts the display (400), that volume may concurrently change as well according to a sliding or scaling process. Any number of processes may be used to determine what changes in the characteristics of the audio output (430) are to be made. These processes may be formulated into a set or sets of computer readable program code to be executed by the processor (FIG. 1, 120).

Additionally, although FIGS. 4A-5C show a specific placement of the audio output device (405) relative to the display (400), the present specification contemplates the placement of the audio output device (405) at any location. Indeed, in some examples, the placement of the audio output device (405) may be presented to a user relative to the display (400). The position of the user relative to the display (400) may be assumed by the processor described herein in order to determine how and to what extent the audio is to be adjusted. In any of these examples, a user may input distances between the audio output device (405), the display (400), and/or the user as well as their relative placement in order for the process to adjust the audio output as described herein. In a specific example, the audio output device (405) may be placed in the stand (420) in order to direct audio towards a user (435). In this example, the placement of the display (400) may include placing the display (400) physically between the user (435) and the audio output device (405). The position of the display (400) may be detected and the audio adjusted accordingly as described herein. In an example, the audio output device (405) may be placed in both the display (400) as well as the stand (420) with the processor controlling the audio output with the audio compensator as described herein. In this example, the audio output from both of the audio output devices (405) may be currently compensated based on their respective positions to the display (400).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (FIG. 1, 120) of the computing device (FIG. 1, 100) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a display device that includes a sensor to detect a position of the display device in order to adjust audio output from an audio output device. The sensor may detect the position of the display device and, with a processor, adjust the audio output from the audio output device based by execution of a number of preset audio output adjustment settings. This allows for an optimal audio output from the audio output device regardless and in light of the any position of the display which may prevent the audio output from reaching a user's ears.

The preceding description has been presented to illustrate and describe examples of the principles described. This description is not intended to be exhaustive or to limit these principles to any precise form disclosed. Many modifications and variations are possible in light of the above teaching.

What is claimed is:

1. A computing device, comprising:
   a display;
   an audio output device;
   a sensor to detect the position of the display relative to the audio output device; and
   a processor to receive the detected position of the display and adjust audio output from the audio output device based on the detected position of the display;
   wherein the processor is further to adjust the audio output from the audio output device lased on what specific user is logged into the computing device such that different audio adjustment settings are associated with different users.

2. The computing device of claim 1, wherein the processor adjusts the audio output based on a plurality of preset adjustment settings.

3. The computing device of claim 2, wherein a first preset adjustment setting of the plurality of adjustment settings is selected based on a set position of the display relative to the audio output device.

4. The computing device of claim 2, wherein the processor receives input to adjust any one of the plurality of present adjustment settings despite the position of the display.

5. The computing device of claim 1, wherein the display has arranged positions comprising a vertical position, a horizontal position, and a 45-degree angle position.

6. The computing device of claim 1, wherein the processor is to adjust the audio output by adjusting one of:
frequencies of sound emitted by the audio output device,
a number of frequencies of sound produced by the audio output device,
a range of frequencies of sound produced by the audio output device,
a volume of any given frequency of sound produced by the audio output device, and
a pitch of sound produced by the audio output device.

7. The computing device of claim 1, further comprising:
a base; and
an adjustable arm on which the display is mounted, the adjustable arm extending from the base.

8. The computing device of claim 1, wherein the processor is further to adjust the audio output from the audio output device based on a position of a user relative to a viewing surface of the display.

9. A computing device, comprising:
a base;
an adjustable mechanical arm extending from the base;
a display supported on the adjustable arm;
an audio output device;
a processor communicatively coupled to the display and audio output device; and
a position sensor to detect the position of the display;
wherein the processor receives a detected position of the display and adjusts audio output from the audio output device based on the detected position of the display;
wherein the display has an enumerated number of positions relative to a surface supporting the base and display; and
wherein each of the enumerated number of positions has a corresponding audio output setting to be executed b the processor.

10. The computing device of claim 9, wherein the processor receives input to adjust the corresponding audio output settings.

11. The computing device of claim 10, wherein the adjusted corresponding audio output settings are saved on a data storage device for execution by the processor when the display is placed in a corresponding position.

12. The computing device of claim 9, wherein the processor adjusts the audio output from the audio output device by adjusting frequencies of sound emitted by the audio output device based on the detected position of the display.

13. The computing device of claim 9, wherein the processor is further to adjust the audio output from the audio output device based on what specific user is logged into the computing device such that different audio adjustment settings are associated with different users.

* * * * *